US006772856B2

(12) United States Patent
Ishii

(10) Patent No.: US 6,772,856 B2
(45) Date of Patent: Aug. 10, 2004

(54) FINE JET CONTROL-TYPE SOUND ABSORPTION SYSTEM

(75) Inventor: Tatsuya Ishii, Chofu (JP)

(73) Assignee: National Aerospace Laboratory of Japan, Tokyo (JP)

(*) Notice: Subject to any disclaimer, the term of this patent is extended or adjusted under 35 U.S.C. 154(b) by 0 days.

(21) Appl. No.: 10/167,459

(22) Filed: Jun. 13, 2002

(65) Prior Publication Data

US 2003/0006089 A1 Jan. 9, 2003

(30) Foreign Application Priority Data

Jul. 4, 2001 (JP) ........................................ 2001-202953

(51) Int. Cl.$^7$ ................................................ B64F 1/26
(52) U.S. Cl. ...................... 181/210; 181/202; 181/203; 181/286
(58) Field of Search ................................. 181/210, 238, 181/284, 286, 288, 293, 290, 292, 213–218

(56) References Cited

U.S. PATENT DOCUMENTS 4,231,447 A * 11/1980 Chapman .................... 181/213
5,962,107 A * 10/1999 Lowery et al. ............. 428/131

OTHER PUBLICATIONS

M. S. Howe, "Attenuation of Sound in a Low Mach Number Nozzle Flow", Journal of Fluid Mech. (1979), vol. 91–2, pp. 209–299.

D. W. Bechert, "Sound Absorption Caused by Vorticity Shedding, Demonstrated with a Jet Flow", Journal of Sound and Vibration, (1980)—vol. 70–3, pp. 389–405.

A. Cummings, "Acoustic Nonlinearities and Power Losses at Orifices", AIAA Journal, 1983—vol. 22, pp. 786–792.

I. J. Hughes, et al—"The Absorption of Sound by Perforated Linings", Journal of Fluid Mech., (1990)—vol. 218, pp. 299–335.

* cited by examiner

Primary Examiner—Kim Lockett
(74) Attorney, Agent, or Firm—Westerman, Hattori, Daniels & Adrian, LLP

(57) ABSTRACT

The fine jet control type sound absorption system of this invention, aimed at absorbing low-frequency sound with both discrete frequency and broadband frequency to the same degree as already existing acoustic lining can do, is composed of two parts. One is a barrier wall covering an air space in which the concerning low-frequency sound propagates and having a multiplicity of small holes formed therein. The other is the means for causing a fine jet passing through these small holes into or out from the air space. This sound absorption system realizes a fine jet in the vicinity of the barrier wall for the purpose of canceling the sound inside the air space by means of the interference of the sound with the fine jets. Any of or a combination of shape of small holes, jet ejection angle or suction angle, amount of jet flow, thickness of a barrier wall back layer and air flow angle at which secondary air flows into the barrier wall back layer is selected.

16 Claims, 4 Drawing Sheets

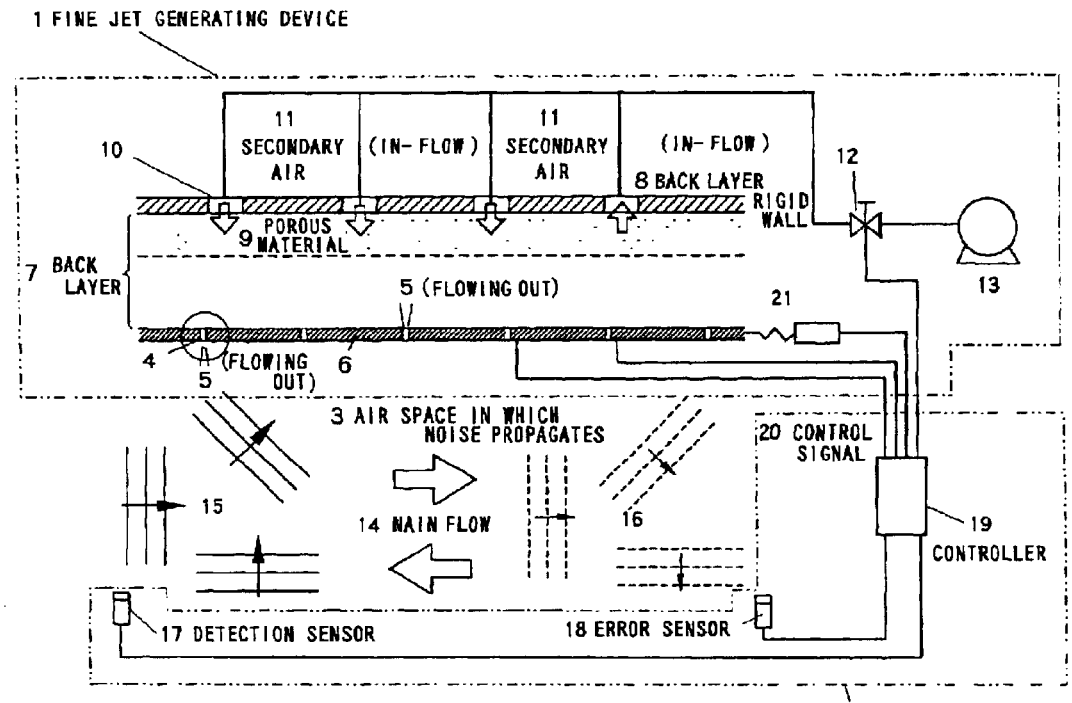
FIG.1 FINE JET CONTROL-TYPE SOUND ABSORPTION SYSTEM
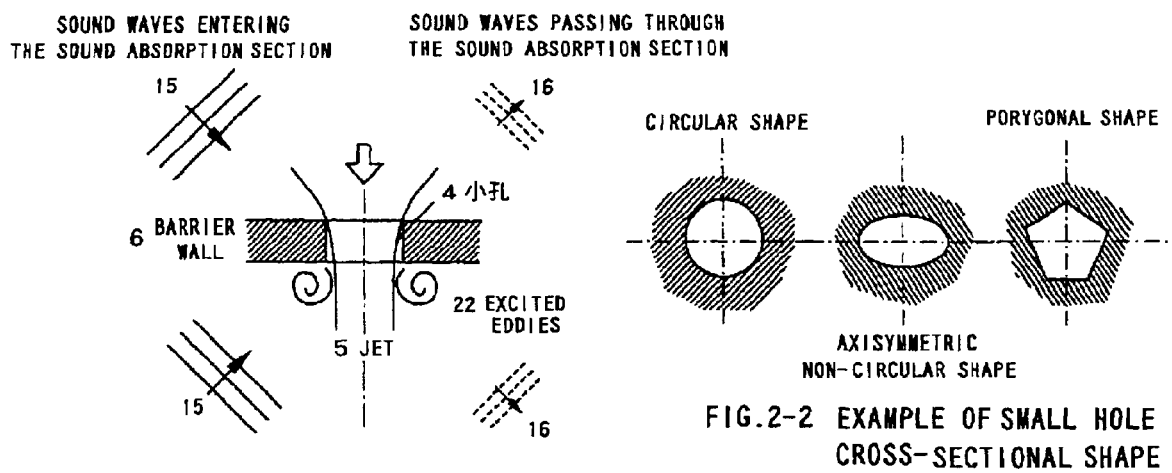
FIG.2-1 DETAIL FIGURE OF THE VICINITY OF A SMALL HOLE
FIG.2-2 EXAMPLE OF SMALL HOLE CROSS-SECTIONAL SHAPE

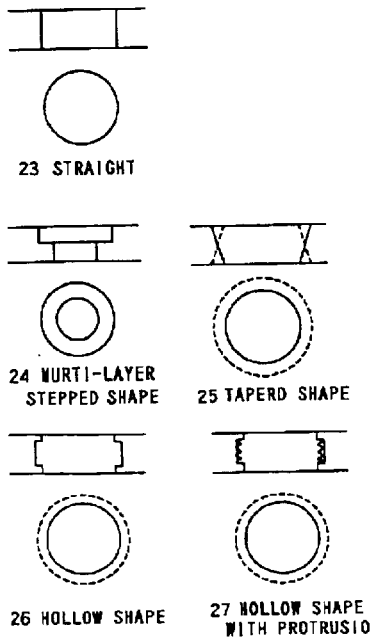
FIG.3-1 SMALL HALE BARRIER WALL OPENING CROSS-SECTIONAL SHAPE
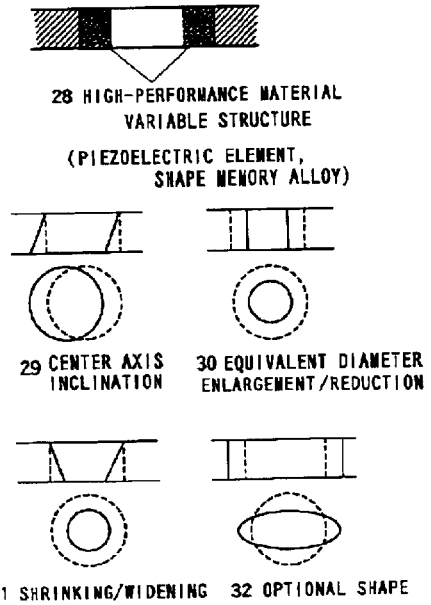
FIG.3-2 VARIABLE HOLE SHAPE BY MEANS OF A HIGH-PERFORMANCE MATERIAL
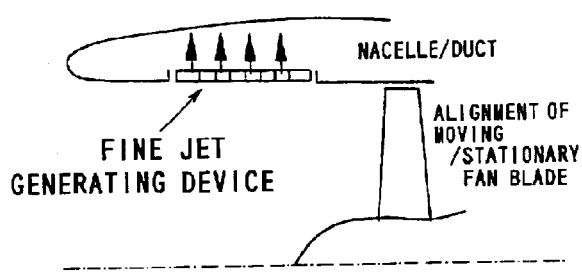
FIG.4-1 EXAMPLE1. TURBO FAN ENGINE/FAN, LOW FREQUENCY SOUND SUPPRESSION
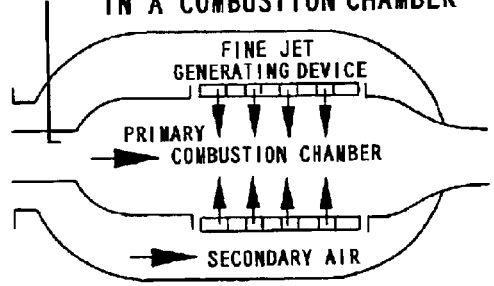
FIG.4-2 EXAMPLE2. SUPPRESSION OF COMBUSTION VIBRATION IN A COMBUSTION CHAMBER MODEL(3)
NUMBER OF SMALL HOLES:96, HALE DIAMETER:2.3mm
DEGREE OF OPENING:0.2

M : MACH NUMBER OF COMPRESSED FLOW
WHEN PASSING THROUGH SMALL HOLE

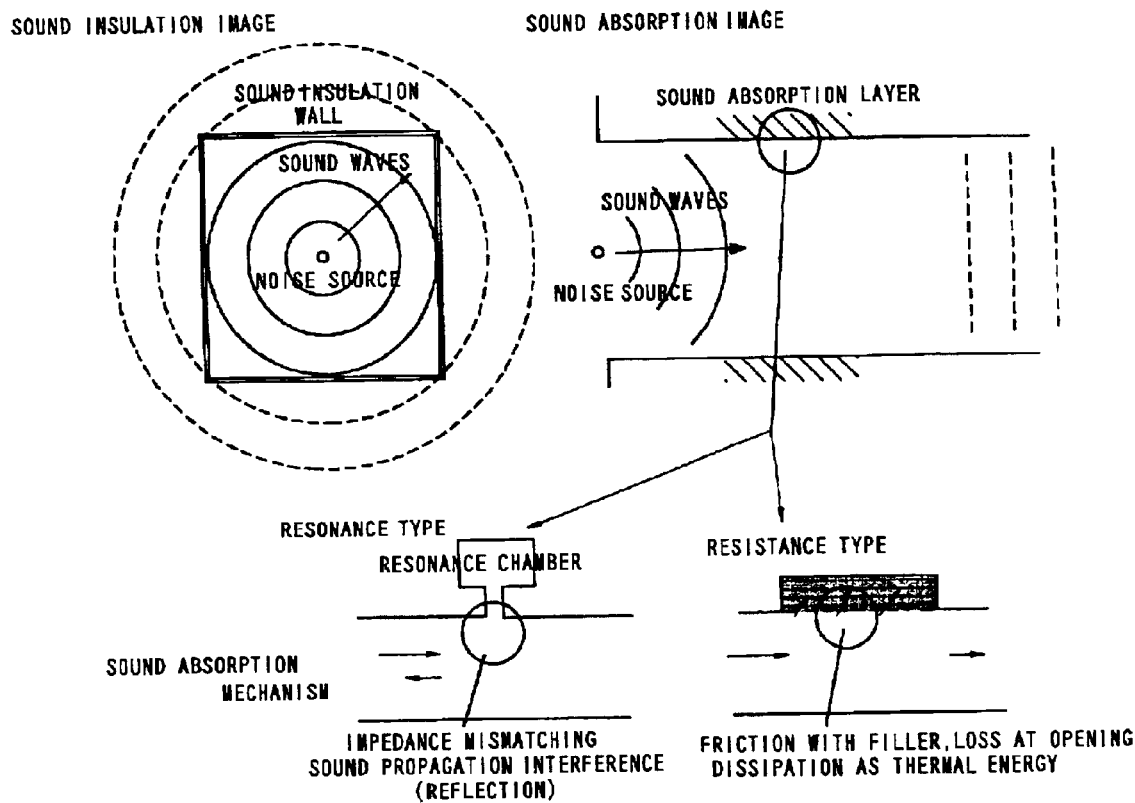
FIG.6-1 SOUND INSULATION AND SOUND ABSORPTION
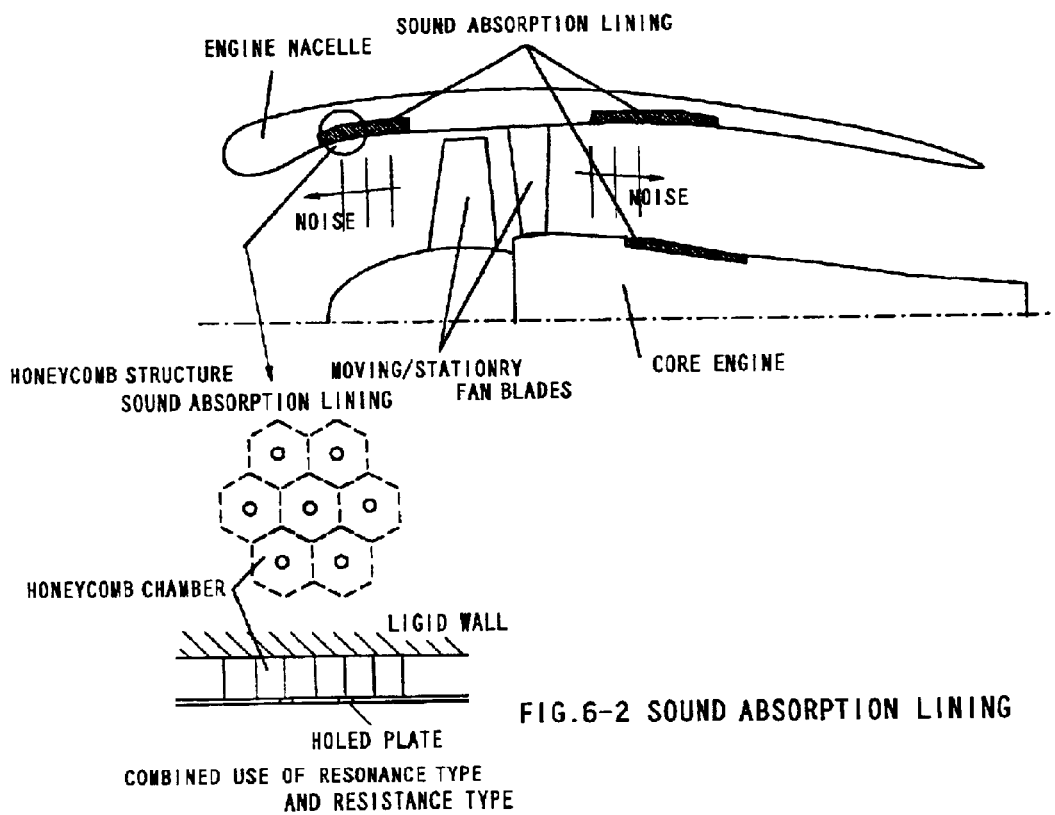
FIG.6-2 SOUND ABSORPTION LINING
COMBINED USE OF RESONANCE TYPE AND RESISTANCE TYPE

FINE JET CONTROL-TYPE SOUND ABSORPTION SYSTEM

BACKGROUND OF THE INVENTION

1. Field of the Invention

The present invention relates to sound absorption technology for reducing noise, and more particularly relates to sound absorption technology that is effective in the suppression of low frequency turbo-machinery noise of a gas turbine or the like used in aviation, ships, and power generation, as a countermeasure against low frequency vibration and noise in large ducts for intake and exhaust at plants and the like, in noise reduction for air conditioning and household appliances, and for making a more comfortable work space at a construction site and the like, and a more comfortable traveling environment inside a vehicle, a passenger compartment, and the like.

2. Description of the Related Art

Well-known and conventionally used examples of general sound prevention means are: a sound insulation system that uses a sound insulating wall of the kind illustrated in FIG. 6-1, and sound absorption systems such as a resonance-type sound absorption system whose action is one of sound propagation interference based on impedance mismatching, or a resistance-type sound absorption system that induces a conversion into thermal energy produced by friction with a filler or loss at an opening. In an aircraft engine, a sound absorption device that has an ordinary honeycomb structure like that shown in FIG. 6-2, or a bulk-type sound absorption device, are principally employed. The former, the honeycomb type device, utilizes two-fold sound attenuation resulting from impedance mismatching by means of the resonance of a honeycomb chamber and from resistance when air passes through a throat portion. For a broader applicable frequency band, a sound absorption device has been put into practical use that has a dual-layer or multi-layer honeycomb structure in which honeycomb chambers of different capacity are interconnected through small openings. Generally, honeycomb-structure sound absorption devices are unsuitable for use in severe high-temperature environments. With the latter bulk type device, there is a correlation between the bulk filling factor and the frequency band, working from the fundamental principle of sound attenuation resulting from friction of incident sound wave with material in the bulk. In recent years, the application of ceramic-type heat-resisting material in high-temperature jet engines has been investigated. In order that these sound absorption devices should afford optimum noise reduction effects, honeycomb chamber capacity, degree of opening, filling factor, installation area, and the like, are selected as design points. Although the sound absorption devices mentioned above have a certain absorption performance, these devices also exhibit the problems of generating a pressure loss, a weight increase, and performance degradation beyond the scope of the design points.

As far as fan noise is concerned, the fan noise frequency falls in accordance with an increase in the bypass ratio. As a result, the honeycomb chamber capacity increases, which leads to an increase in engine weight and a pressure loss during cruising. On account of also not being able to track a change in noise frequency characteristics in accordance with a change in the fan rotation speed, there are limitations on the amount of noise reduction with conventional sound absorption devices, reduction amount. Also with regard to jet noise, there is a method that reduces noise in two stages, by first making a small scale vortex structure in a mixing acceleration device, such as a mixer, to shift the noise frequency band toward higher band, and then diminishing this higher frequency noise by sound absorbing material or by distance attenuation. However, this method is accompanied by the problem that thrust loss generated by the mixer components and a weight increase for the ejector are inevitable and that the provision of a demountable mechanism for the mixer causes a further weight increase. A general low noise problem, for example, with respect to low frequency sound, such as resonance generated within a long duct of large diameter is such that it is problematic to install existing sound absorbing material in a limited space. When a branch resonance pipe is used, in addition to there being an increase in the dimensions of the branch pipe, performance degradation beyond the scope of design points is considerable.

On the other hand, it has become apparent from the latest research that a phenomenon occurs according to which, when low-frequency sound waves impinge on a jet that passes through a hole and is ejected into a free air space, there is sound energy loss, and this phenomenon has been a matter of interest among researchers. In research to date, in predictions using theoretical models, simple modeling has been tested with regard to small-hole diameter, jet flow speed, degree of opening, back layer thickness, and the angle of incidence of sound waves with respect to a jet. However, there are few examples of sound absorption effects being examined, and, barely any verified results for cases of using complicated hole shapes, in particular, have been found. Further, as yet, there are no cases of practical uses being performed to optimize sound absorption efficiency by actively changing the aerodynamic and acoustic qualities surrounding the jet passing through a small hole.

SUMMARY OF THE INVENTION

It is an object of the present invention to provide, in the context of sound canceling technology of the kind described above, a sound canceling technology, which, (1) absorbs low frequency sound including discrete frequency sounds and broadband frequency sounds to the same degree as existing sound-absorbing lining, and is capable of markedly reducing installation area in comparison with sound-absorbing lining;

(2) is capable of suppressing growth of an acoustic mode in an air space even without an adjustment mechanism by means of optimization of the shape of the small holes even in a high sound pressure and high temperature environment of a combustion chamber or similar;

(3) is capable of maintaining sound absorption efficiency by tracking a change in the noise characteristics of a low frequency sound source that has wavelengths equal to or greater than a small hole diameter, also in a case where, at a reference frequency, 50% of acoustic design points fail; and (4) is capable of minimizing weight increase produced by movable devices that are visible in a sound-absorbing panel, the consumption of electrical energy for drive, pressure loss, and the like, and effects on operating performance of the main system.

The fine jet control-type sound absorption system of the present invention comprises: a barrier wall, which partially covers an air space in which noise propagates and which has a multiplicity of small holes formed therein; and means for causing a fine gas flow passing through these small holes to flow into or out from the airspace, which sound absorption system generates, by means of the passage of gas, a fine jet in the air space in the vicinity of the barrier wall, to cancel noise, wherein any of or a combination of the shape of the small holes, a jet ejection angle or entrance angle, a jet flow amount, the thickness of a barrier wall back layer, and an air flow angle at which air flows into the barrier wall back layer, is selected.

Further, in order to enhance sound absorption effects, the fine jet control-type sound absorption system of the present invention further comprises: an adjustment control mechanism, which installs an error sensor in a noise air space, and which, so that the output of this error sensor is minimized, regulates any of or a combination of the shape of the small holes, a jet ejection angle or entrance angle, a jet flow amount, the thickness of a barrier wall back layer, and an air flow angle at which air flows into the barrier wall back layer. For the shape of the small holes, an optional shape can be selected for the barrier wall opening cross-section and a minute protrusion may also be formed at the leading and trailing edges of the opening in accordance with requirements, and, in a barrier wall thickness direction, an opening formed with a multi-layer step, a taper, a hollow or a protrusion can be selected, it being possible to selectively employ any of or a combination of the above shapes and constitutions.

Further, the fine jet control-type sound absorption system of the present invention is provided with a plurality of barrier wall portions which have a different degree of opening, equivalent diameter, small-hole shape and jet speed, and the like, permitting optimum sound absorption effects for each frequency band, and which are employed in suitable combination in accordance with noise frequency, wherein an adjustment control mechanism has a constitution in which a high-performance material, such as a piezoelectric element, a shape memory alloy, and the like, is embedded in the vicinity of a small hole or in part of the barrier wall, and, by slightly changing the shape of a small hole in accordance with a control signal from outside, controls a separation phenomenon of shear eddies generated by the jet to adjust the sound absorption band and sound absorption amount.

Further, in the fine jet control-type sound absorption system of the present invention, barrier walls, which are formed having a multiplicity of small holes, are installed in multiple layers, and means for displacing individual barrier walls is provided, so that, by shifting a relative positional relationship between small holes, an improvement of sound absorption characteristics is made possible.

BRIEF DESCRIPTION OF THE DRAWINGS

The present invention will now be described with reference to the attached figures.

FIG. 2-1 is a figure to illustrate a state in the vicinity of a small hole, and FIG. 2-2 is a figure to show an example of a small hole cross-sectional shape;

FIG. 3-1 is a figure for a small hole cross-sectional shape example in a barrier wall thickness direction, and FIG. 3-2 is a figure to show an example of a variable hole shape using high-performance material;

FIG. 4-1 is a figure to show an example of installation of a system according to the present invention for low frequency sound suppression for a turbo fan engine or a fan, and FIG. 4-2 is a figure to show an example of installation of a system according to the present invention for suppressing combustion vibration in a combustion chamber;

FIG. 6 is a figure to illustrate a conventional sound prevention technology.

DESCRIPTION OF THE PREFERRED EMBODIMENTS

The present invention is a sound absorption technology that is effective in the suppression of low-frequency turbomachinery noise of a gas turbine or the like used in aviation, ships, and power generation, and that was inspired by application of the phenomenon according to which, when sound waves of a low frequency noise impinge on a jet that passes through a hole and is ejected into a free air space, there is sound energy loss. In predictions using theoretical models, simple modeling has been tested with regard to small-hole diameter, jet flow speed, degree of opening, back layer thickness, and the angle of incidence for sound waves with respect to a jet. However, as yet, there are few examples of examinations with regard to sound absorption systems that utilize this phenomenon, and barely any verified results have been found for cases of using complicated hole shapes, in particular. Although no complete explanation or analysis on this phenomenon has been accepted, the mechanism of this phenomenon can be understood as a conversion, of some of the sound by a jet flow, that results when a steady-state fine jet interferes with sound waves that change in a non-steady state. Therefore, the present inventor undertook tests to optimize sound absorption efficiency by changing, in a diverse manner, the physical (aerodynamic, acoustic, and so forth) conditions affecting a jet passing through the small holes.

Figures 1, 5:
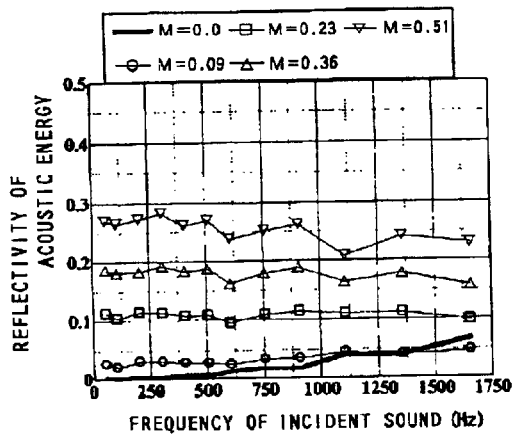
FIG. 1 is a figure to show the fundamental constitution of a fine jet control-type sound absorption system relating to the present invention.
FIG. 5 is a figure to show investigation results that confirm sound absorption effects using the system according to the present invention.

The physical conditions affecting a jet passing through the small holes were examined, keeping in mind small hole shape, jet flow speed, degree of opening, back layer thickness, and angle of incidence of sound waves with respect to the jet flow. A conceptual diagram for the fine jet control-type sound absorption system of the present invention is shown in FIG. 1 and described hereinbelow. Part of an inner face of an engine nacelle constituting a noise source (see FIG. 4-1), of a combustion chamber wall face (see FIG. 4-2), of a duct piping inner face, or of an engine exhaust cone surface, and the like, constitutes a barrier wall 6 with small holes. The air space, which is surrounded by this barrier wall, can be a three-dimensional air space constituted by optional faces of a cylinder, a sphere, a non-circular cylinder, or a polygon, and the like, and the barrier wall with small holes can be formed by all or a section of these faces. A structure is adopted in which a secondary air introduction or extraction opening 10 is provided in the back layer 7 of the barrier wall with small holes, to permit secondary air from the outside, of an optional flow amount, to be uniformly introduced to or extracted from the back layer 7. Since substantially the same acoustic effects are afforded by the introduction of a jet into an acoustic air space and by the extraction of a jet from an acoustic air space, an introduction aspect alone is described hereinbelow in the present specification to represent both an introduction aspect and an extraction aspect.

Figures 2, 5:
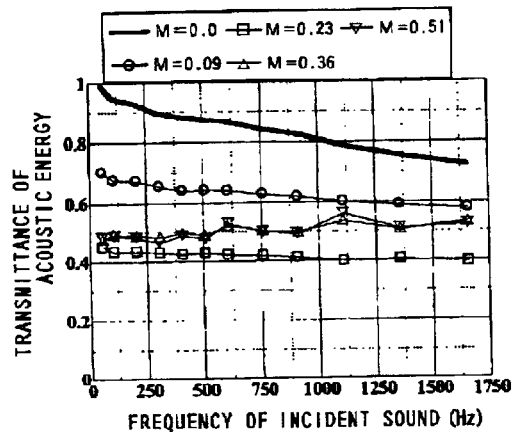

Assuming that a structure is such that, instead of directly introducing secondary air from a secondary air inlet into the air space of the back layer 7, secondary air is introduced via a layer filled with a porous material 9, the air flow from the secondary air inlet is diffused within the porous material 9 and crosses a wide area such that it is possible to maintain uniformity. If secondary air is obtained from an external air supply 13 such as a compressor air bleed, by controlling a flow regulating valve 12, it is possible to optionally regulate the secondary air flow amount, that is, the jet Mach number. To optimally regulate the reflection coefficient and the absorption coefficient of sound waves entering the barrier wall, optimization is required of the small hole shape and the jet speed that acts in accordance with the small hole shape. FIG. 2-1 schematically shows the relationship between a jet 5 in the vicinity of a small hole 4 in a barrier wall 6 and resultant eddies 22, and an incident sound wave 15 and a reflected sound wave 16. When a jet 5, in which a gas flows from one small hole to another, is present, a boundary layer at a downstream opening separates to thereby produce the eddies 22. The phenomena of intake at the top of the barrier wall 6 in the figure and blow-out at the bottom of the barrier wall 6, affect incident sound waves 15 to produce reflected waves 16.

Figures 3, 5:
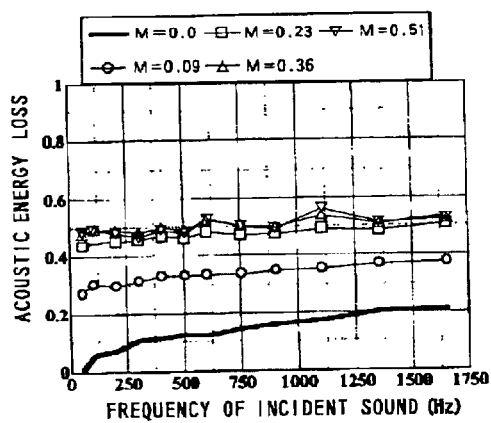

As far as small-hole shape is concerned, a form is adopted that changes, in a diverse manner, the physical (aerodynamic, acoustic, and so forth) conditions affecting a jet, and with regard to the barrier wall opening cross-section, optional shapes may be used such as a circular shape, an axisymmetric non-circular shape (an elliptical shape), a polygonal shape, or the like, as illustrated in FIG. 2-2, for example. In a barrier wall thickness direction, as shown in FIG. 3-1, an opening shape has been arrived at and verified that is formed with a multi-layer stepped shape 24, a tapered shape 25, a hollow shape 26, or a hollow shape 27 with a protrusion. In addition, although not shown in the figure, a form, in which a minute protrusion is formed at the leading and trailing edges of an opening, makes it possible to change the state of the jet and the formation of eddies. By means of selective combination of the above shapes, the scale of separation eddies upon generation of a jet can be made to cover a wide frequency band and the sound absorption band can thus be enlarged.

As far as blowing speed of a fine jet is concerned, an optimum range exists that minimizes the reflectivity for a given degree of opening, and, in a case where the thickness of a barrier wall in which small holes are cylindrical is unrestrictedly small, it has been found that an apparent Mach number of a fine jet passing through a hole becomes an optimum value when the Mach number is smaller than the degree of opening by approximately 20 to 30%. In addition, it was confirmed that the equivalent diameter of the small holes, the jet ejection angle, and the thickness of the back layer also affect the sound absorption coefficient and its frequency response. Accordingly, the present inventor aimed at realizing a system of a system for which the sound absorption coefficient is far superior in comparison with existing sound absorbing material alone by optimally combining the above parameters and affording compatibility with existing sound absorbing material.

Furthermore, in order to bring about a change in sound absorption characteristics to match a change in noise source characteristics, the addition of an adjustment control mechanism 2 which, while causing a change to the above small hole shape and the like using a low-power, miniature actuator, adjusts jet speed in keeping with this change, was found to be effective. As means for changing the small hole shape and the like, it was determined to fix a high-performance material element 28, such as a piezoelectric element, a shape memory alloy, and the like, into the barrier wall 6, this high-performance material element 28 being a cylindrical member forming a small hole section, as shown in 28 of FIG. 3-2. By supplying an applied voltage to this high-performance material 28 or subjecting same to a temperature change, modification is induced such that the small hole center axis is inclined as shown in 29 of FIG. 3-2, and it is possible to realize modification such that the hole diameter is equivalently enlarged or reduced, as shown in FIG. 3-2 (30), such that the hole diameter is enlarged or reduced in a tapered shape for a shrinking/widening form, as shown in FIG. 3-2 (31), or such that the hole diameter adopts an optional design shape (an ellipse in this example), as shown in FIG. 3-2 (32). Further, by providing means for installing barrier walls, which are formed having a multiplicity of small holes, in multiple layers, and for displacing individual barrier walls, and by slightly displacing the barrier walls in a vertical direction with respect to the small hole center axis, an improvement of sound absorption characteristics was confirmed. This slight displacement of relative positions between barrier walls aims at putting multiple barrier walls aims at putting multiple barrier walls in layer, breaking an axisymmetric interference mode between vortex and a hole due to slight shift in relative position between concerning holes, and eventually expanding the frequency band of sound absorption.

Accordingly, on the basis of these discoveries, the present invention adopts a constitution in which a detection sensor 17, which detects sound waves 15 entering a sound absorption section, and an error sensor 18, which detects sound waves 16 passing through the sound absorption section, are installed in the location of the noise, noise in this location is detected by these sensors and then outputs from these sensors are directed to a controller 19, control signals 20 are sent by the controller 19 to the above high-performance material element 28 constituting a small-hole section, to a jet flow control valve 12, and to a wall displacement device 21, using a multiple input/multiple output adjustment control algorithm, and an adjustment filter factor is updated successively such that output by the error sensor is thus minimized. That is, the detection sensor 17 detects principal components contained by noise, the frequency band of each component, and the sound pressure level of each component, and then selects components that are to be reduced. Here, in addition to control 29 of the jet introduction direction, control 30 of the small hole equivalent diameter, control 31 of the center axis shape, control 32 of the small hole cross-sectional shape, the adjustment control mechanism functions to cause slight displacement of the multi-layer barrier walls in a direction perpendicular with respect to a small hole center axis, and, because the results of this control are sensed by the error sensor 18, regulation amounts are decided upon in order to minimize these [sensed error] values.

In an arrangement of the sound cancellation actions of the system of the present invention, the order is as follows:

(1) action to minimize the reflectivity of low-frequency sound at the barrier wall in accordance with the passage of a jet, in other words, action to convert acoustic energy into fluid-dynamic energy when eddies are produced;

(2) action to increase the sound absorption coefficient by means of an innovation regarding the internal and external shape of the small holes; and (3) action to vary the sound absorption characteristics by adjusting structural, fluid-dynamical and acoustic conditions on the small hole and its surroundings.

EXAMPLE 1

Figures 4, 5:
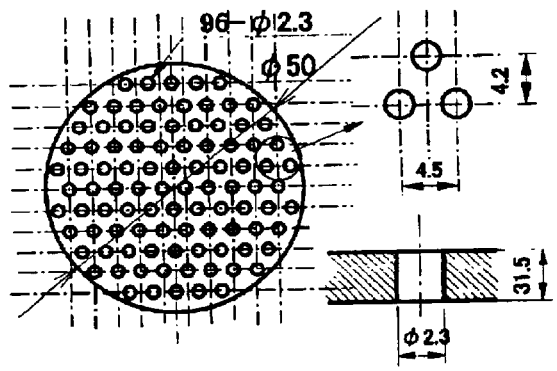

FIG. 4-1 shows an example of a noise absorber installed in an intake of an aircraft engine and in a combustion chamber. In an intake, small holes are formed in an inner face of the nacelle, and a jet is made to pass through these small holes. Noise, which is emitted from a fan or compressor during take-off and landing, is absorbed. However, during cruising, the jet is stopped to avoid wasting bleed air. Similarly, in an engine exhaust, small holes are provided in the cone section thereof, and, in a case of supersonic jet propulsion, small holes are provided also inside the ejector. As is true for the intake, operation is only during take-off and landing. Within the combustion chamber, autonomous operation is generated using a small hole plate alone by some of the secondary air being vented to a primary liner as shown in the figure, or by the use of pressure fluctuations within the primary liner.

In either case, an auxiliary power unit or a compressor causes the blow-down or suction of a cluster of fine jets though the nacelle wall. When the stepped shape 24 or the tapered shape 25 in FIG. 3-1 is adopted as the small hole shape, eddies that have separated from the hole leading edge are caused to cling once again thereto, and by means of an optimum design to match the jet speed, the sound absorption band can thus be widened. In addition, the same is true for a shallow-bottomed cavity between the leading and trailing edges of a small hole, or for a cavity with a protrusion. In the same way as a cavity, forms in which holed plates form multiple layers, plates with different equivalent diameters are stacked, or a hole center position is displaced, are also effective. If the shape of the cross-section is made non-circular or polygonal, the excitation of eddies of a plurality of scales and a widening of the sound absorption band may be anticipated.

When used for an adjustment control mechanism, a plate containing small holes, for which a piezoelectric material or a high-performance material is employed, is able to effect a variation in the shape of the small holes, in the equivalent diameter thereof, and in the jet direction. Since noise frequency characteristics vary according to the operating state of an engine, by accordingly varying these parameters in addition to the jet flow amount, optimum sound absorption effects are obtained. For control of this variable amount, error sensors installed inside and outside the engine are used to continually measure noise emission levels, and corresponding data is sent to a computer used for control. The computer, which has obtained an error signal, changes the shape of the high-performance material and controls the barrier wall displacement device and flow regulating valve, and finally regulates the parameters so that error signals are minimized.

Further, an air supply is required to drive the jet, but in an engine, the air bleed of the compressor is used. Since the degree of opening is from 1 to 20%, and the optimum Mach number of the jet is from 0.01 to 0.15 and small, the amount of bleed air is small.

The fine jet control-type sound absorption system of the present invention comprises: a barrier wall, which partially covers an air space in which noise propagates and which has a multiplicity of small holes formed therein; and means for causing a fine gas flow passing through these small holes to flow into or out from the airspace, which sound absorption system generates, by means of the passage of gas, a fine jet in the air space in the vicinity of the barrier wall, to cancel noise, wherein, by using any of or a combination of the shape of the small holes, a jet ejection angle or entrance angle, a jet flow amount, the thickness of a barrier wall back layer, and an air flow angle at which air flows into the barrier wall back layer, it is possible to obtain sound absorption effects with an installation area that is considerably smaller than that for a sound absorption lining. Further, the fine jet control-type sound absorption system of the present invention is capable of maintaining sound absorption efficiency by tracking a change in the noise characteristics of a low frequency sound source that has wavelengths equal to or greater than a small hole diameter, also in a case where, at a reference frequency, 50% of acoustic design points fail; and is capable of minimizing weight increase produced by movable devices that are visible in a sound-absorbing panel, the consumption of electrical energy for drive, pressure loss, and the like, and effects on operating performance of the main system.

For the shape of the small holes, an optional shape can be selected for the barrier wall opening cross-section, and, in a barrier wall thickness direction, an opening formed with a multi-layer step, a taper, a hollow or a protrusion can be selected, it being possible to selectively employ any of or a combination of the above shapes. The fine jet control-type sound absorption system of the present invention is capable of suppressing growth of an acoustic mode in an air space even without an adjustment mechanism by means of optimization of the shape of the small holes even in a high sound pressure and high temperature environment of a combustion chamber or similar.

The fine jet control-type sound absorption system of the present invention [further] comprises: an adjustment control mechanism, which installs an error sensor in a noise air space, and which, so that the output of this error sensor is minimized, regulates any of or a combination of the shape of the small holes, a jet ejection angle or entrance angle, a jet flow amount, the thickness of a barrier wall back layer, and an air flow angle at which air flows into the barrier wall back layer, and, as a result, this fine jet control-type sound absorption system is capable of still more effective sound absorption.

A plurality of barrier wall portions are provided, which have a degree of opening, an equivalent diameter, a small-hole shape and a jet speed permitting optimum sound absorption corresponding to a frequency band, and which are employed in suitable combination in accordance with noise frequency, and, as a result, this fine jet control-type sound absorption system is capable of effectively suppressing noise in wide frequency band.

An adjustment control mechanism has a constitution in which a high-performance material, such as a piezoelectric element, a shape memory alloy, and the like, is embedded in the vicinity of a small hole or in part of a barrier wall, and, by slightly changing the shape of the small hole in accordance with a control signal from outside, controls shear eddies generated by the jet to regulate the sound absorption band and sound absorption amount, which enables still more effective sound absorption in a wider frequency band.

By providing means for installing barrier walls, which are formed having a multiplicity of small holes, in multiple layers, and for displacing individual barrier walls, and by shifting a relative positional relationship between the small holes, an improvement of sound absorption characteristics is made possible.

In this connection, test results that confirm the effects of the present invention are shown in FIG. 5. When a pipe is partitioned using the test piece (barrier wall) shown in FIG. 5-4, in which 96 small holes with a 2.3 mm diameter are disposed at a horizontal interval of 4.5 mm and a vertical interval of 4.2 mm, and a jet is made to pass through the test piece, noise enters from upstream and downstream of this test piece and sound is detected at 32 points within the pipe, and, after determining a correlation factor at each point, the reflectivity R and transmittance T of the test piece are measured. In the graphs shown in FIGS. 5-1, 5-2, 5-3, the horizontal axis represents frequency values for the noise input, and the vertical axis respectively represents reflection coefficient of an acoustic wave in FIG. 5-1, transmission coefficient in FIG. 5-2, and energy loss (EL) corresponding to the sound absorption coefficient in FIG. 5-3. M is the apparent optimum Mach number for air passing through a small hole (in actuality, this is close to 20% larger). Results are using measurement of a reflection coefficient, transmission coefficient, and an energy loss coefficient, of a small-hole section. The energy loss (EL) coefficient is a numerical value obtained by subtracting the reflection coefficient R and the transmission coefficient T from 1. When M=0.085, the sound absorption ratio rises in comparison with a case when there is no jet (M=0.0), and, when M=0.20, 0.30, 0.40, the sound absorption ratio increases further. It is therefore possible to confirm that the sound absorption coefficient increases as a result of the presence of the jet.

What is claimed is:

1. A sound absorption system, comprising:

a barrier wall covering an air space in which noise propagates; and holes disposed in said barrier wall, said holes having at least one adjustable dimensional feature that optimizes absorption efficiency of said barrier wall by a fine jet passing through said holes.

2. A sound absorption system, according to claim 1, wherein each of the holes includes a high performance material element that permits adjustment of the at least one adjustable dimensional feature of said holes.

3. A sound absorption system, according to claim 2, wherein said high performance material element is a piezoelectric element.

4. A sound absorption system, according to claim 2, wherein said high performance material element is a shape memory alloy.

5. A sound absorption system, according to claim 1, wherein said barrier wall includes at least two layers that are displaceable relative to each other to permit adjustment of the at least one adjustable dimensional feature of said holes.

6. A sound absorption system, according to claim 1, wherein the barrier wall includes at least two layers that are displaceable in a vertical direction with respect to a center axis of each of said holes to permit adjustment of the at least one adjustable dimensional feature of said holes.

7. A sound absorption system, according to claim 1, further comprising an adjustment control mechanism that controls adjustment of the at least one adjustable dimensional feature of said holes and a vector of the fine jet.

8. A sound absorption system, according to claim 7, wherein said adjustment control mechanism includes:

a first sensor detecting a first value of at least one noise component in sound waves entering said barrier wall;

a second sensor detecting a second value of the at least one noise component in sound waves passing across said holes; and a controller controlling the adjustment of the at least one adjustable dimensional feature of said holes and the vector of the fine jet to keep the second value lower than the first value of the at least one noise component.

9. A sound absorption method, comprising:

setting at least one adjustable dimensional feature of holes disposed in a barrier wall covering an air space in which noise propagates to control a fine jet passing through said holes; and adjusting the at least one adjustable dimensional feature of the holes to control the fine jet to vary interference between incident sound and the fine jet.

10. A sound absorption method according to claim 9, wherein said adjusting adjusts the interference by adjusting at least one of a structural condition of the hole, a fluid-dynamical condition of the fine jet, and an acoustic condition around the holes.

11. A sound absorption method according to claim 9, further comprising:

detecting a first value of at least one noise component in sound waves entering the barrier wall; and detecting a second value of the at least one noise component in sound waves passing across said holes, wherein said adjusting adjusts the at least one adjustable dimensional feature of the holes and the fine jet to keep the second value lower than the first value of the at least one noise component.

12. A sound absorption method according to claim 9, wherein said adjusting controls a high performance material element in each of the holes.

13. A sound absorption method according to claim 9, wherein said adjusting drives a piezoelectric element in each of the holes.

14. A sound absorption method according to claim 9, wherein said adjusting shapes a shape memory alloy in each of the holes.

15. A sound absorption method according to claim 9, wherein said adjusting displaces at least two layers in the barrier wall relative to each other.

16. A sound absorption method according to claim 9, wherein said adjusting displaces at least two layers in the barrier wall in a vertical direction with respect to a center axis of each of the holes.

* * * * *